United States Patent

[11] 3,554,509

[72] Inventors Craig C. Waddle
 Englewood;
 Robert K. Harris, Littleton, Colo.
[21] Appl. No. 782,072
[22] Filed Dec. 9, 1968
[45] Patented Jan. 12, 1971
[73] Assignee Mintech Corporation
 a corporation of Colorado. by mesne
 assignments

[54] DISCHARGE GRATE FOR CIRCULAR SHAFT KILN
 6 Claims, 1 Drawing Fig.
[52] U.S. Cl. .................................................. 263/29,
 214/18
[51] Int. Cl. .................................................... F27b 9/00,
 F27b 9/18
[50] Field of Search .......................................... 263/29, 30;
 214/18V, 17.4, 17.2

[56] References Cited
UNITED STATES PATENTS
3,360,249 12/1967 Trumbo et al. ............... 263/29
3,401,922 9/1968 Jones, Jr. ....................... 263/29

Primary Examiner—John J. Camby
Attorney—Ralph F. Crandell

ABSTRACT: A discharge grate for a circular shaft kiln includes a concentric plurality of coplanar annular retarder plates defining concentric annular throats. A plurality of radially extending pusher rods each mounts a series of annular sector-shaped pusher plates which, when positioned over the annular throats, retard the flow of solids through the grate, and which, upon reciprocation of the rods, move to open the throats and push material off the edges of the retarder plates.

PATENTED JAN 12 1971

3,554,509

INVENTORS
CRAIG C. WADDLE
ROBERT K. HARRIS

BY Ralph F. Crandell
ATTORNEY

DISCHARGE GRATE FOR CIRCULAR SHAFT KILN

BACKGROUND OF THE INVENTION

The field of the invention is that of discharge grate mechanisms for vertical shaft kilns. More particularly, the invention relates to a discharge grate mechanism finding particular, but not necessarily exclusive, use in connection with large diameter vertical circular shaft kilns.

Kilns and furnaces adapted to accommodate a continuous, gravity induced flow of discreet or particulate solid materials in exposure to fluids, either gas or liquid, for purposes of carrying out a reaction between the solids and the fluid, have long been known and utilized for the processing and treatment of many specific substances. Appropriately styled "shaft kilns," such structures are extensively employed in many industrial applications. In some applications, thermal reactions are promoted by means of hot gases contacting the solids. In such processes, the efficacy of the reaction is, in large measure, determined by the uniformity of solids movement through all zones of the kiln and the uniformity of the gas flow permeating the solids. As a significant factor, means are desirably provided for controlling the discharge of solids from the kiln to effect a uniform flow rate for all solids moving through the unit. Hence, the instant invention is directed to the provision of an improved grate structure for effecting discharge of the solids while allowing hot gases or liquid fluids to pass through the solids in the kiln. While some solid materials are relatively free flowing, others, particularly under reaction conditions, tend to compact and a bed of such materials can be made to move downwardly through the kiln only with difficulty. The criterion for the movement of solids through the kiln is a factor known as the "angle of repose." The angle of repose of a given material is the angle from the horizontal of an imaginary plate on which the material will not rest, but will slide off the plate. Where a flat plate is used, a triangular-shaped static bed of material will remain above the plate, and the angle of the sidewalls of the pile from the horizontal will be the angle of repose. It will be appreciated that some materials will have a very low angle of repose and will flow readily. Other materials however, will have a high angle of repose approaching or exceeding 90.°These materials will not flow, but will tend to bridge across the grate openings.

The prior art is principally evidenced in U.S. Pat. No. 3,027,147, issued Mar. 27, 1962 to Lewis H. Brakel and John B. Jones, Jr., for "Circular Shaft Kiln Discharge Grate." This patent discloses a circular shaft kiln discharge grate embodying circular or annular pusher members adapted for orbital movement between concentric deflector members and subjacent retarder plates. The retarder plates define annular throats underlying the deflector members, while the concentric deflector members define annular throats overlying each of the retarder plates. The pusher members are positioned between the deflector members and the retarder plates to push material through the grate mechanism.

A related structure is disclosed in copending application of Craig C. Waddle, John C. Scott and Robert K. Harris, Ser. No. 733,435, filed May 31, 1968, for DISCHARGE GRATE MECHANISM FOR SHAFT KILN. The grate mechanism there disclosed is an improved construction over the mechanism shown in U.S. Pat. No. 3,027,147, and includes a plurality of radially extending individual pusher bars, in place of the unitary orbitally moving circular pusher members, to discharge material through the grate.

The angle of repose of the material being treated in the kiln determines the spacing between the deflector members and the retarder plates, so that when the pusher members are stationary, material will not flow through the grate. It will be appreciated that materials which compact or bridge may not flow through the deflector plates, but instead tend to bridge across them so that the prior art grate mechanisms become ineffective to promote the flow of materials having a bridging characteristics through the kiln.

OBJECTS OF THE PRESENT INVENTION

The principle object of the present invention is to improve existing grate discharge mechanisms for vertical shaft kilns.

A further object of the present invention is to simplify and reduce the cost of heretofore relatively complex, and expensive discharge grate mechanisms for shaft kilns.

More specifically, it is an object of the present invention to provide a circular shaft kiln discharge grate mechanism which finds particular but not exclusive use in connection with solid materials which tend to compact and bridge when a deep bed of the material is placed in a vertical shaft kiln.

Still a further object of the present invention is to provide a shaft kiln discharge grate mechanism of the foregoing character which is useful for a wide variety of sizes, shapes and types of granular solid materials.

SUMMARY OF THE INVENTION

Figure 2:
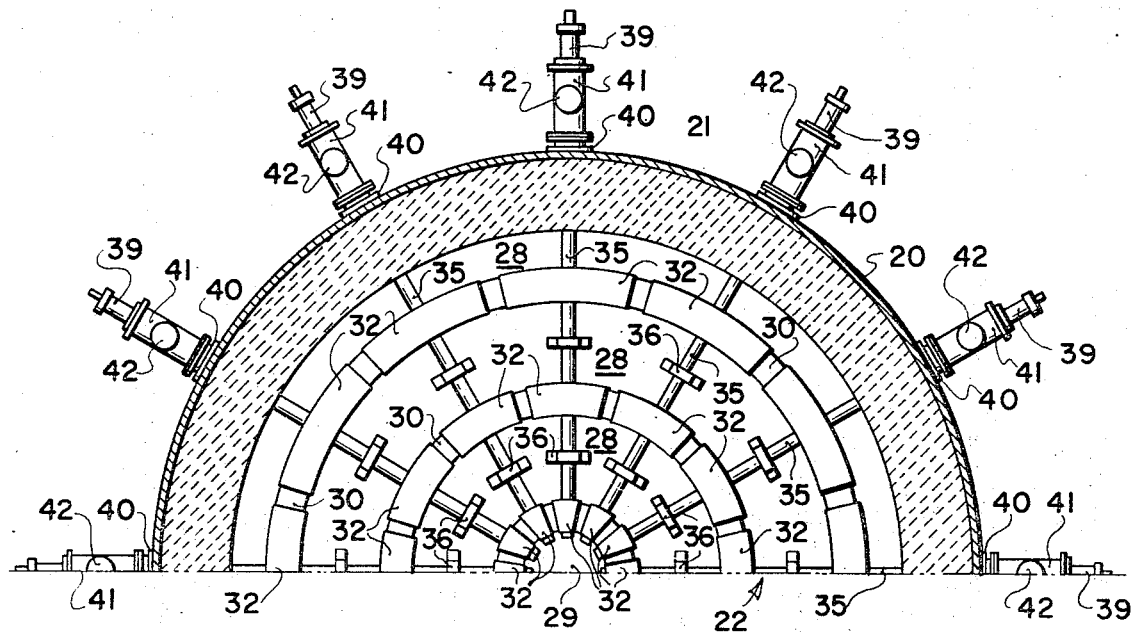
FIG. 2 is a half-transverse section view taken substantially in the plane of line 2–2 on FIG. 1 and illustrating, in top plan, one illustrative mechanism embodying the present invention.
Figure 1:
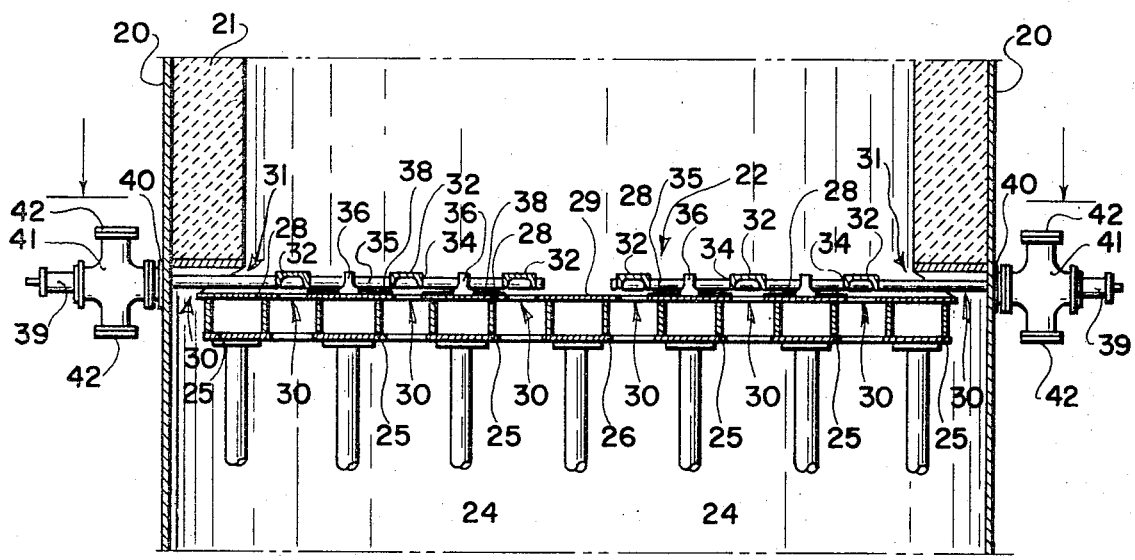
FIG. 1 is a somewhat diagrammatic section view taken axially through a discharge grate mechanism embodying the present invention and showing an adjacent portion of a vertical shaft kiln in which the grate mechanism is mounted.

The present invention is embodied in a discharge grate mechanism for a vertical shaft kiln. The mechanism is comprised essentially of a coplanar array of annular retarder plates defining with one another a plurality of annular discharge throats. Structural support means are provided to support the discharge grate mechanism in the shaft kiln. In order to regulate the flow of material contained within the kiln through the grate, there is provided a plurality of annular sector shaped pusher members mounted on radially reciprocable pusher rods and positioned to open or close the annular throats in any desired sequence. Movement of the pusher rods and pusher members in a radial direction not only serves to alternately open and close the discharge throats, but also shears the material contained within the kiln adjacent the grate to insure the flow of material through the grate throats. Each of the pusher rods is individually powered by an appropriate motor mounted externally of the kiln. Sliding seals are provided for the rods through the kiln wall and the rods are supported by bearing plates which slidably engage the retarder plates.

DESCRIPTION OF THE PREFERRED EMBODIMENT

The grate structure shown in the drawing exemplifies the present invention and finds particular but not necessarily exclusive use in association with transversely circular shaft kilns of moderate to large diameters for handling materials which tend to compact or bridge. An illustrative kiln comprises an axially vertical tubular shell 20 of appropriate rigid material and of any expedient construction. The kiln shell 20 is generally provided with an appropriate refractory liner 21. In order to control the flow of solids material through the kiln, a discharge grate mechanism, indicated generally at 22 and embodying the present invention, is mounted in the lower end of the shell 20. The lower end of the kiln may be closed with provision being made for withdrawing solids material therefrom after treatment in the kiln.

For purposes of mounting the grate structure 22 within the kiln, an internal support structure is provided. The illustrative structure shown comprises a plurality of vertical supporting posts 24 mounted on the bottom (not shown) of the shell 20. At their upper ends, the posts 24 support a plurality of annular structural members 25 surrounding a single central cylindrical structural member 26. The annular structural members 25 in turn support a plurality of concentric coplanar annular retarder plates 28, while the central structural member 26 supports a single circular retarder plate 29 centrally of the array of annular plates 28. The plates 28 and 29 form a coplanar and concentric array of retarder plates, with the outer circumference of the outer annular retarder plate 29 being spaced beneath the refractory lining 21 of the kiln. The retarder plates 28, 29 further define a plurality of concentric annular throats 30, the outermost one of which is defined between the outer retarder plate 28 and the outer shell wall 20. The axial spacing between the outer annular retarder plate 28 and the refractory lining 21, as indicated at 31, is determined both by the angle of repose of material which will be handled in the kiln and by the space requirements of the operative members of the grate structure.

The flow of particulate solid materials through the kiln is regularly controlled by a plurality of individual, annular sector shaped, pusher members 32 positioned above each of the annular throats 30 defined between the retarder plates 28, 29. These pusher members 32 are shaped generally as annular sectors, with the width of each member corresponding approximately to the width of the annular retarder plate throats, so that the pusher members substantially, but not completely, cover the annular throats. The pusher members 32 as shown are formed generally as channels with downwardly extending legs 34 terminating slightly above the place of the retarder plates, so as to provide space for the passage of reaction fluids. Each pusher member is circumferentially spaced slightly from the adjacent member to provide fluid flow passages, as well as to provide for movement of the pusher members radially of the kiln. To this end, the length of each annular pusher member 32 is such that the members do not interfere with adjacent members upon radial movement thereof.

Each annular throat 30 is covered by a group of pusher members 32, each of which groups contain an equal number of pusher member components, and with the corresponding pusher members 32 of each group being radially aligned and secured to a radially extending pusher rod 35. In order that the pusher members 32 may move back and forth over the retarder plates in a raking or shearing action, they are mounted on the pusher rods 35 so as to be so positioned slightly above the surface plane of the retarder plates 28. The pusher rods 35 extend radially inwardly of the kiln through the shell 20 thereof and are supported for radially oscillating movement by bearing blocks 36 fixed thereon which slidably engage tracks 38 defined on the upper surface of the annular retarder plates 28.

For purposes of driving the rods 35, axially, in a radial movement with respect to the retarder plates, appropriate motors, such as hydraulic piston and cylinder motors 39, are mounted externally of the kiln shell 20. Each motor is operatively connected with an associated pusher rod and is individually actuated so as to power the rod 35 in an axial or back and forth movement. The hydraulic motors may, for example, comprise double-acting hydraulic piston and cylinder motors of conventional construction and operation. Such units are actuated by supplying hydraulic fluid to one end of the motor while exhausting fluid from the other end. A hydraulic pressure fluid system is provided (not shown) and the supply of hydraulic fluid to each cylinder is controlled through an appropriate direction valve and limit control mechanism (not shown). The relative operation of each of the motors may of course be coordinated in order to minimize stresses on the kiln shell 20 and on the pusher members 32.

The pusher rods 35 are sealingly mounted and supported in the kiln wall 20 by means of sleeve-type sealing nozzles 40, welded or otherwise sealingly mounted on the shell. A connector housing 41 is sealed onto the nozzle; and in turn supports the motor 39. The housing 41 is provided with one or more access and drain ports 42. Where desired, the pusher rods and pusher members may be hollow to provide for the transmission of coolants or to provide for the introduction of fluids into the interior of the kiln. To this end, the pusher members may be hollow, boxlike members instead of channels. Also, thermocouples or other control devices can be contained in or carried by the rods or pusher members, and the housing access ports provide for convenient access to the interior of the rods for such purposes.

It will be appreciated that by moving the pusher rods 35 radially in and out, the pusher members 32 will be moved away from the annular throats allowing material contained in the kiln bed to drop through the grate. This movement also produces a shearing action on the bottom end of the bed of material in the kiln to prevent bridging of the material across the annular throats 30. In this manner, the pusher mechanism serves two purposes, that is it both closes and opens the annular throats, and also breaks or shears the lower end of the bed of solid material to keep the bed material from bridging and plugging the grate. This insures that the kiln bed will move continuously downward through the kiln with a uniform linear action.

In addition to providing for the uniform downward movement of the solid bed through the kiln, the grate mechanism herein described permits the upward or downward flow of fluid materials through the kiln for purposes of treating the material contained in the bed of solids. Moreover, the grate structure herein described is substantially simplified over structures heretofore known, and is adaptable to a wide variety of kiln sizes and shapes. Accordingly, while a certain illustrative grate structure has been shown in the drawings and described above in considerable detail, it should be understood that there is no intention to limit the invention to the specific form and structure disclosed. On the contrary, the intention is to cover all modifications, alternative constructions, equivalents and uses falling within the spirit and scope of the invention as expressed in the appended claims.

We claim:

1. A discharge grate mechanism for a vertical shaft kiln of the type adapted to confine a bed of discreet particulate solid material for continuous gravity flow therethrough, said grate mechanism comprising, in combination, a plurality of concentric coplanar annular retarder plates, a central circular retarder plate concentric and coplanar with said annular plates, said retarder plates defining a plurality of concentric coplanar annular discharge throats, a plurality of annular sector shaped pusher members spacedly overlying and substantially covering said coplanar throats, a plurality of pusher rods extending radially within said kiln above said retarder plates and mounted for radial reciprocal movement with respect to said kiln, each of said pusher rods mounting a plurality of said pusher members, and means for radially oscillating said pusher rods and the pusher members carried thereby whereby said annular throats are alternately opened and closed and material contained in said kiln is discharged through said grate.

2. For use with a vertical shaft kiln adapted to confine a bed of discreet particulate solid material for continuous gravity flow therethrough, a discharge grate mechanism comprising, in combination, a plurality of spaced, coplanar retarder plates, said retarder plates defining a plurality of coplanar discharge throats, a plurality of pusher members overlying and substantially covering said throats, and means for oscillating said pusher members above said throats and retarder plates to alternately open and close said throats and simultaneously to shear the bottom of the bed of material in said kiln and discharge said material through said throats.

3. A discharge grate mechanism for a vertical shaft kiln adapted to confine a bed of discreet particulate solid material for continuous gravity flow therethrough, said kiln having an outer shell with an inner liner therein extending over the upper portion of said shell, said grate mechanism comprising, in combination, a plurality of concentric coplanar retarder plates, means mounting said retarder plates substantially transversely of said kiln below said inner lining thereof, said retarder plates defining with each other and with the outer kiln shell a plurality of concentric coplanar annular discharge throats, a plurality of groups of annular sector-shaped pusher bars, each of said groups overlying one of said coplanar throats, each of said groups having an equal number of annular sector shaped pusher bars therein, a plurality of radially extending pusher rods corresponding in number to the number to the number of annular sector shaped pusher bars in each of said groups, said pusher rods extending radially within said kiln shell above said retarder plates and sealingly mounted for radial reciprocal movement through said kiln shell, each of said pusher rods mounting a corresponding one of each group of said pusher bars, and means for radially oscillating said pusher rods and the pusher bars carried thereby whereby when said pusher bars are positioned over said annular throats solid material contained within said kiln is retarded from movement through said kiln and when said pusher rods are radially oscillated said pusher bars shear the portion of the bed of material adjacent said retarder plates and push said material through said annular throats to effect a uniform discharge of said material through said grate thereby promoting a uniform downward flow of material through the kiln.

4. A discharge grate mechanism as defined in claim 3 wherein said pusher bars are shaped as downward opening channels having depending legs positioned spacedly adjacent the plane of the upper surface of said retarder plates.

5. A discharge grate mechanism as defined in claim 3 including bearing means on each of said pusher rods and bearing track means on said retarder plates slidably supporting said rod mounted bearing means.

6. A discharge grate mechanism as defined in claim 3 wherein the annular sector shaped pusher members in each group are circumferentially spaced from the adjacent members in said group.